Nov. 1, 1966

R. B. APPLEGATE 3,283,190

DYNAMOELECTRIC MACHINE

Filed Oct. 18, 1965

INVENTOR.
ROBERT B. APPLEGATE
BY
Oberlin, Maky & Donnelly
ATTORNEYS

Nov. 1, 1966 R. B. APPLEGATE 3,283,190
DYNAMOELECTRIC MACHINE
Filed Oct. 18, 1965 7 Sheets-Sheet 2

INVENTOR.
ROBERT B. APPLEGATE
BY
Oberlin, Maky & Donnelly
ATTORNEYS

Nov. 1, 1966   R. B. APPLEGATE   3,283,190
DYNAMOELECTRIC MACHINE
Filed Oct. 18, 1965

INVENTOR.
ROBERT B. APPLEGATE
BY
Oberlin, Maky & Donnelly
ATTORNEYS

INVENTOR.
ROBERT B. APPLEGATE

Nov. 1, 1966 R. B. APPLEGATE 3,283,190
DYNAMOELECTRIC MACHINE
Filed Oct. 18, 1965 7 Sheets-Sheet 5

INVENTOR.
ROBERT B. APPLEGATE
BY
Oberlin, Maky & Donnelly
ATTORNEYS

INVENTOR
ROBERT B. APPLEGATE

BY Oberlin, Maky & Donnelly
ATTORNEYS

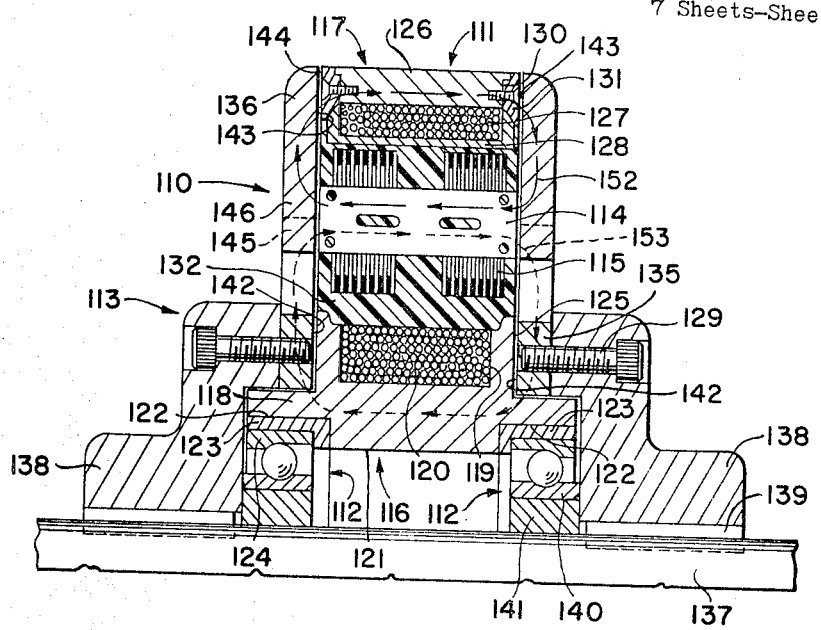

United States Patent Office 3,283,190
Patented Nov. 1, 1966

3,283,190
DYNAMOELECTRIC MACHINE
Robert B. Applegate, 4883 Grace Ave.,
North Olmsted, Ohio
Filed Oct. 18, 1965, Ser. No. 502,762
11 Claims. (Cl. 310—162)

The present invention is a continuation-in-part of applicant's copending application Serial No. 226,684, filed Sept. 27, 1962, now abandoned, and relates generally, as indicated, to a dynamoelectric machine such as an alternating current motor or generator and, more particularly, by way of illustration, to an alternator adapted for use, for example, in the automotive field in place of a conventional D.C. generator in the electrical system.

Alternators, of course, are well known in the art as basically comprising D.C. excited electromagnets or permanent magnets whose magnetic flux, in the case of a three-phase alternator, cuts the turns of three sets of overlapping coils connected in three separate circuits or phases on the stator usually in either a Y or a delta connection. Several advantages are realized by making the rotating rotor the field and the stationary stator the armature; namely, the alternating current may be generated at high voltages because it is not necessary to connect the high voltage through movable contacts; it is not necessary to conduct high load currents through slip rings and brushes; and the stationary armature conductors can be securely mounted and braced in position.

However, known alternators employing rotating exciting magnets comprise a shaft with a central hub, the periphery of which has one or more sets of north and south poles which close their magnetic circuits through the rotor, either common to all exciting magnets, or in pairs or multiple pairs on the rotor. The stator of laminated magnetic materials surrounds the rotor in such manner that the laminated pole segments of the stator extend radially inward toward the rotor, the stator core usually being at ground potential with reference to the generated electricity and the magnet exciting flux (at a given moment) from a north pole enters the laminated stator through one or more pole pieces, and completes the magnetic circuit by passing radially through said pole pieces, circumferentially through the stator, and thence radially inward through pole pieces opposite a south pole of the rotor.

It is therefore a principle object of this invention to provide a dynamoelectric machine of the character indicated, that is, an alternator, for example, which is more efficient in operation, while being lower in manufacturing cost than known machines of the type hereinbefore described.

It is another object to provide an alternator or the like having full flux reversals alternately through the axial portions of the laminated stator pole piece assemblies, such flux flowing virtually in an axial, or axial and radial direction only, and not in an axial and circumferential, or axial, radial and circumferential direction, as is presently required to close the magnetic circuit.

A further object is to provide an alternator or the like having air gaps whereby the magnetic flux passes axially through those portions of the stator pole assemblies around which the stator windings are located.

A still further object is to provide a dynamoelectric machine with a plurality of circumferentially spaced stator pole piece assemblies which are flux isolated and electrically insulated from each other, whereby should there be a break in the insulation of one or more of the stator windings and electrical contact with one or more of the stator pole piece assemblies, the dynamoelectric machine will still operate.

Another object is to provide, in one form of the invention, a dynamoelectric machine with a novel rotor assembly including an iron cup in which there are disposed an iron core and an iron disc, the peripheral portions of such iron cup and disc being in the same plane and notched around their peripheries to provide alternate north and south excitation pole segments with spaces therebetween lying in a common plane axially adjacent the stator pole piece assemblies.

A further object is to provide, in another embodiment of the invention, a dynamoelectric machine with a novel rotor assembly including inner and outer concentric rings disposed in the same plane, such outer ring having radially inwardly extending excitation pole segments between which there are disposed alternate excitation pole segments extending radially outwardly from the inner ring.

Yet a further object is to provide, in still another embodiment of the invention, a full alternator with a rotor assembly of the type last described adjacent one end of the stator pole piece assemblies, and a stationary one-piece cup member adjacent the other end of such stator pole piece assemblies which provides a common flux path for full flux reversals through the stator pole piece assemblies as the alternate rotor pole segments are sequentialy moved therepast.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 13 is a fragmentary radial cross-section view of the alternator of FIG. 12 taken along the line 13—13 thereof; and FIG. 14 is a fragmentary radial cross-section view similar to FIG. 13, but of a further modification of an alternator in accordance with the present invention.

Figure 1:
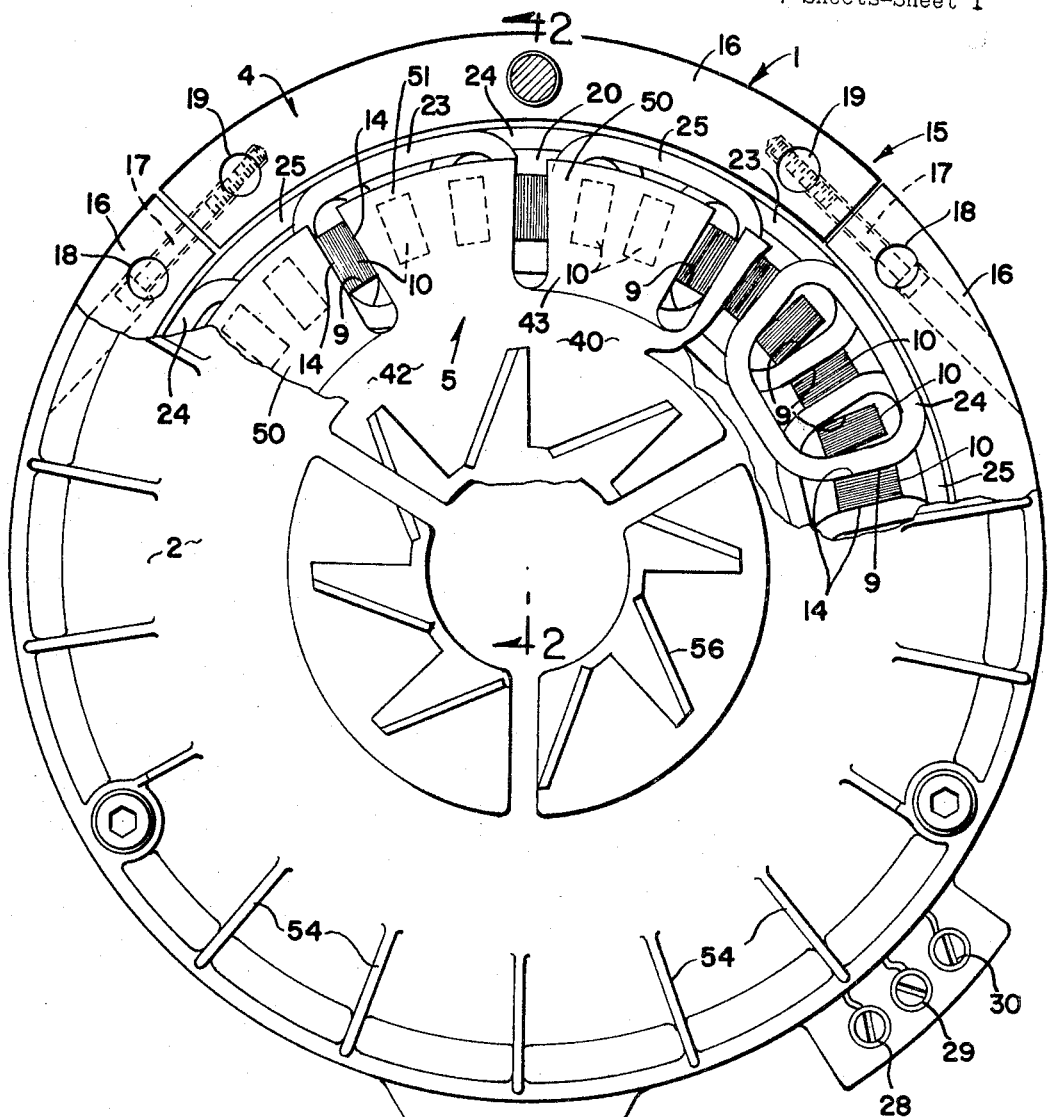
FIG. 1 is a front elevation view, with the housing and rotor partly broken away, of an alternator according to the present invention.
Figure 2:
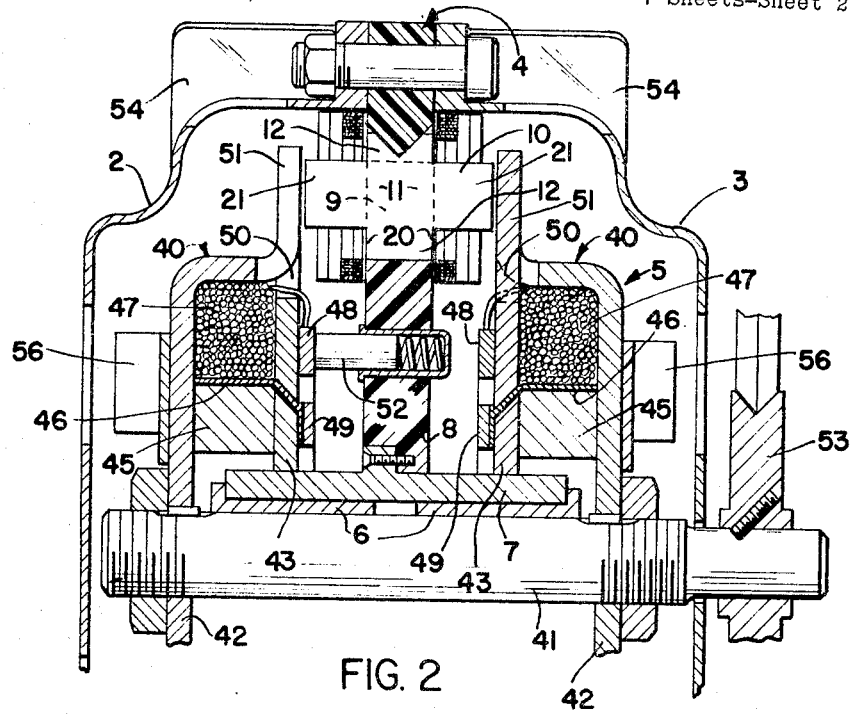
FIG. 2 is a radial cross-section view taken substantially along the line 2—2, FIG. 1.
Figure 3:
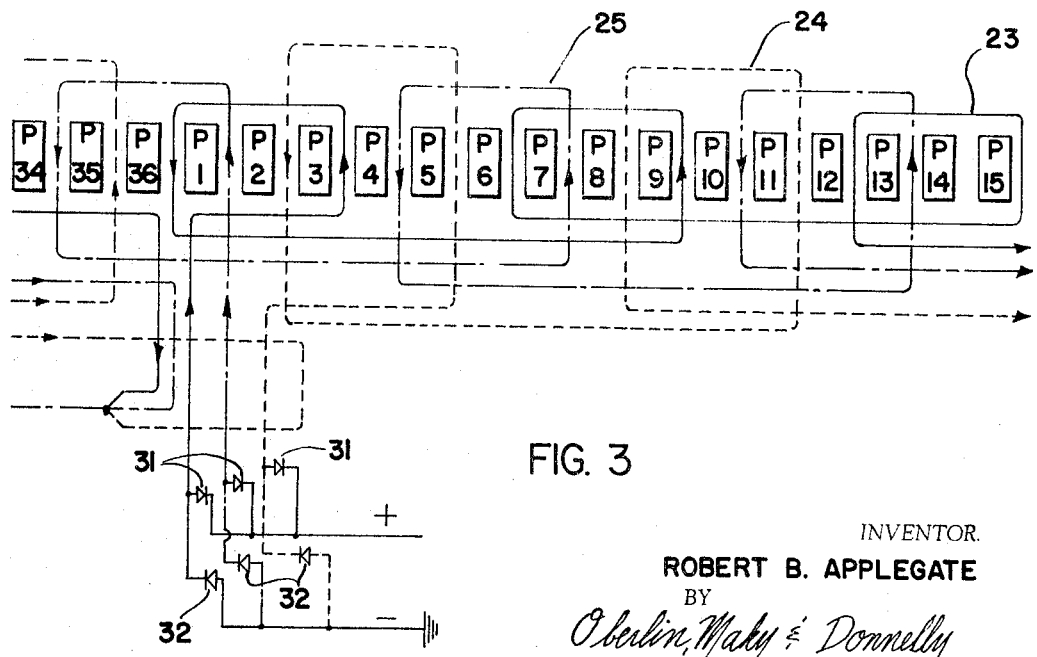
FIG. 3 is a typical wiring diagram of the stator of a three-phase alternator.

Referring now more particularly to the drawings, and first especially to FIGS. 1–3, the alternator 1 there shown comprises a multipart housing 2, 3 having a stator assembly 4 fixedly mounted therein and a rotor assembly 5 journaled as by suitable bearings 6 for rotation with respect to the stator assembly 4.

The stator assembly 4 may, for example, as herein shown, comprise a central hub 7 for the bearings 6 to which a ring 8 of electric insulating material is fastened. The periphery of the ring 8 is provided with a plurality of radial slots 9, herein for purposes of illustration there being thirty-six such slots, in each of which is mounted a pole piece 10 comprising a stack of laminations 11 (FIG. 2) in the shape of a cross with the central cross arms 12 disposed in the respective slots of ring 8, such pole pieces 10 further having end laminations 14 of insulating material. The pole pieces 10 are hled in the slots 9 as by a surrounding stator ring 15 made up of individual segments 16 secured together as by screws 17 passing through swivel pins 18 and threadedly engaged with swivel pin nuts 19.

The segments 16 have V-shaped inner edges to engage in corresponding V notches in the respective pole pieces 10. If desired, thin rings 20 of insulating material may be cemented or otherwise secured on opposite sides of the rings 8 and 15 further to assist in retaining the pole pieces 10 in place, such thin rings 20 being slotted for axial projection of the main arms 21 therethrough.

Wound around the thirty-six arms 21 of the stator pole pieces 10 on each side are three sets of coils 23, 24, 25, the winding progressing as schematically illustrated in FIG. 3.

Considering the three sets of coils 23, 24, and 25 in detail, the windings of the first set 23 span the pole pieces 10 numbered in FIG. 3 as P1–P2–P3; P–7–P8–P9; P13–P14–P15; P19–P20–P21; P25–P26–P27; and P31–P32–P33. Similarly, the windings of the second set 24 span the pole pieces denoted as P3–P4–P5; P9–P10–P11; P15–P16–P17; P21–P22–P23; P27–P28–P29; and P33–P34–P35. Finally, the windings of the third set 25 span the pole pieces designated as P5–P6–P7; P11–P12–P13; P17–P18–P19; P23–P24–P25; P29–P30–P31; and P35–P36–P1.

The beginning ends of the windings of the three sets of coils 23, 24, 25 are joined together and the finishing ends lead to three terminals 28, 29, 30 and to three positive rectifiers 31 (not shown in FIGS. 1 and 2) and three negative rectifiers 32 to form the positive and negative (or ground) sides of the stator circuit.

As a matter of interest, the pole pieces 10 each project one-half inch from the opposite faces of the assembly of rings 8 and 15 and they each present rectangular pole faces one-half inch wide radially by one-quarter inch thick tangentially. Similarly, by way of example, each winding of the coil sets 23, 24, 25 may comprise twelve turns of rectangular copper wire for each grouping of three alternate poles, thus making 72 turns in series per phase winding.

Referring now in detail to the rotor assembly 5, it comprises two electromagnets 40 mounted on the rotor shaft 41 so as to be disposed at opposite ends of the pole pieces 10 with north poles opposite south poles to provide magnetic flux paths axially of the stator 4 through the respective pole pieces.

Each electromagnet 40 comprises a pair of nested or interfitted pole members 42 and 43 which are secured to an iron core ring 45 as by suitable screws or the like (not shown). Wound around the core ring 45 around an insulating sleeve 46 is the exciting coil 47 of the electromagnet 40 and, in the present example, it may comprise 207 turns of No. 19 insulated magnet wire, the ends of which are connected to concentric slip rings 48 and 49 of which ring 49 is insulated from the pole member 43. The pole member 43 may comprise a flat iron disk (¼" thick) notched around its periphery at uniform intervals to leave six radially projecting pole segments 50 which constitute either the north or south pole of the electromagnet 40. The other pole member 42 may be cup-shaped, as shown, the radial flange of which is notched at regular intervals to provide six similar pole segments 51 of opposite polarity with respect to the pole segments 50 of the pole member 43. These sets of pole segments 50 and 51 interfit to provide a ¼" clearance between them. The pole segments 50 and 51 are arranged annularly in a plane which is opposite and closely spaced from the adjacent ends of the laminated pole pieces 10 and again, by way of example, the air gaps may be in the vicinity of from .010 to .040 inch. Due to the air gap between the ends of the pole pieces 10 and the adjacent pole segments 50, 51 and the disposition of such pole pieces in the radial slots 9 in the insulating ring 8, it is readily apparent that the stator pole pieces 10 are flux isolated and electrically insulated from each other. Accordnigly, should there be a break in the insulation of one or more of the stator windings which results in electrical contact between the windings and a different stator pole pieces, the dynamoelectric machine 1 will still operate. Thus, the amount of insulation on the stator windings can be reduced to a minimum without fear of a break in the insulation causing grounding of the entire stator windings or shorting them out. Moreover, because such stator pole pieces 10 are flux isolated and electrically insulated from each other, the amount of flux losses is substantially reduced whereby the maximum flow and generating ability of the dynamoelectric machine is made available to produce induced currents in the coils wound around the stator pole pieces during complete reversal of excitation flux through the stator pole pieces.

Instead of using an insulating ring 8 for flux isolating and electrically insulating the stator pole pieces 10 from each other, it should be understood that the same results could be achieved by molding the entire stator assembly 4 in a suitable plastic to make a unitary structure in which the stator pole pieces are held in the desired spaced relationship.

The two electromagnets 40 disposed on opposite sides of the poles pieces 10 are mounted on the rotor shaft 41 in such a way that the alternate north and south pole segments 50 and 51 of one electromagnet 40 are opposite the alternate south and north pole segments 50 and 51 of the other electromagnet 40.

Carried as by the ring 8 of the stator 4 are two pairs of opposite spring-loaded brushes 52 (staggered 90°) making contact with the respective slip rings 48 and 49 and, of course, the D.C. excitation supply is connected with said brushes 52. One or both faces of the ring 8 may be grooved at the teeth thereof for the D.C. leads, one of which may be grounded.

The rotor shaft 41 has mounted thereon a suitable driving pulley 53. It can be seen that when the rotor 5 is thus driven and its magnets 40 are either permanent magnets or are direct current excited, changing magnetic flux paths extend axially through the pole pieces 10 whereby a three-phase alternating current is induced in the three sets of windings 23, 24, 25 around the groups of pole pieces 10. The pole segments 50 and 51 are each preferably of circumferential width so as to span three pole pieces 10.

The housing sections 2 and 3 may be provided with suitable heat dissipating fins 54 and, of course, the pole members 42 may have vane members 56 secured thereto to induce circulation of cooling air past the electromagnet coils 47 and the three sets of pole piece windings 23, 24, 25, through suitable openings in the housing parts 2 and 3.

Figure 4:
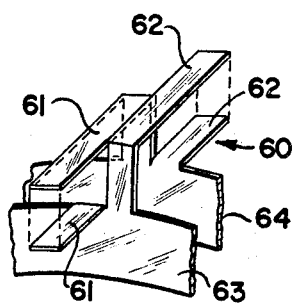
FIG. 4 is a fragmentary perspective view of an alternate design showing a laminated stator made up of a set of similar nested laminations or stampings fitting into each other, such stampings having right angle projections the projecting end surfaces of which form stator pole piece faces.

In lieu of fabricating the pole pieces 10 from flat metal stampings as shown in FIGS. 1 and 2, it is contemplated to make pole pieces 60 from a set of similar stampings fitting into each other, the projecting end surfaces of which form stator pole piece faces as shown in FIG. 4, whereby, in effect, the laminations extend tangentially instead of generally radially as in FIGS. 1 and 2. This modified form of pole piece construction may comprise, for example, twenty different stampings of .025 inch thick stock with each lamination to be cut and formed with, for example, thirty-six right angle projections 61 to one side and thirty-six alternate projections 62 extending to the opposite side. This will result in oppositely extending pole piece faces each of which is approximately one-quarter inch wide tangentially and one-half inch long radially with effective areas like those of the pole pieces 10 shown in FIGS. 1 and 2. In FIG. 4 only the first and twenty-fifth laminations 63 and 64 have been illustrated and it will be apparent that the intervening ones will have progressively longer and shorter projections 61 and 62.

In any event, the magnetic flux paths through the FIG. 4 stator will be axially generally parallel to the rotor shaft in these portions of the laminations around which the stator sets of coils are located.

It is to be noted that the sets of coils 23, 24, 25 associated with the stator pole pieces 10 can be inserted by dropping them over proper groups of pole pieces 10 with a straight movement parallel to the line of the flux path and with no physical distortion of the coils and with no need to lift one coil to place the end of another coil underneath it, as may be required to be done where coils are mounted in radial stator slots in known types of alternators.

The sets of windings 23, 24, 25 can be formed from regular magnet wire or specially shaped magnet wire such as the rectangular wire herein shown so as to provide a greater cross section of conductor for the available area.

Figure 5:
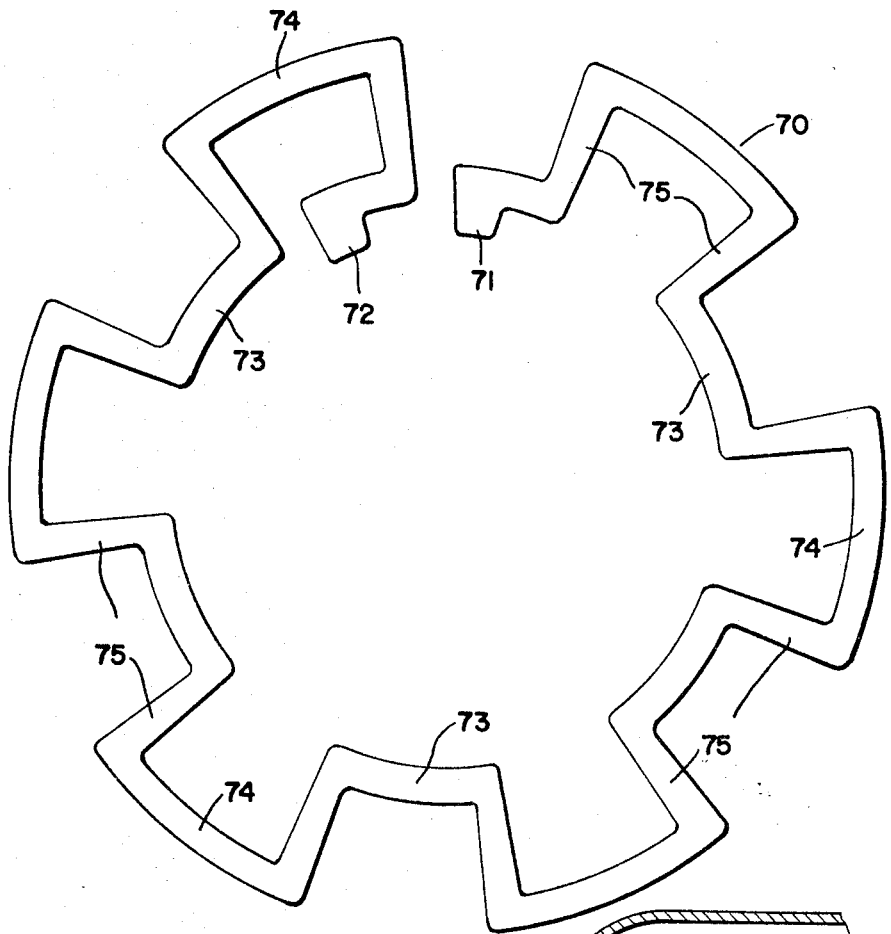
FIG. 5 is a wave form conductor element which may be employed to constitute the stator windings of an alternator.

Furthermore, sets of windings 23, 24, 25 can be produced from sheet copper, aluminum or other electrical conducting material by stamping wave form conductor elements 70 (FIG. 5) which are assembled by welding, soldering or other suitable means, so that each layer becomes a portion of a continuous conductor which forms a complete stator assembly phase set, and may be insulated before being dropped into place over the axially projecting arms 21 of the pole pieces 10. A stamping 70 made in this form as shown in FIG. 5 has the start of a phase winding commence at tab 71 and current would follow clockwise the conductor alternately below and then above each grouping of three pole piece 10 assemblies and ending at tab 72. The second of a number of elements 70 to be series joined in this phase assembly would be another duplicate wave form conductor element 70 mounted upside down with its tab 71 directly over tab 72 of the first element 70. The tabs or projections 71 and 72 of these two elements would be joined together and the current would continue its travel through the second element 70 starting at the junction 72–71 traveling generally counterclockwise and ending at tab 72 on the second element 70 which will be directly over tab 71, the point of beginning of the first element 70. This double element phase assembly will encompass each grouping of three pole piece 10 assemblies with one turn each and the voltage generated would be the equivalent to that generated in a twelve turn single coil encompassing a set of three pole piece 10 assemblies. In the alternate progressive winding of FIG. 3 there are twelve turns per coil and six coils in series per phase or a total of 72 turns per phase assembly. Therefore, twelve wave form conductor elements 70 series assembled and joined at the tabs 71 and 72 and insulated between each layer would be required to produce a single phase winding assembly which would have an equivalent generated voltage equal to the wire wound coil connected in the alternate progressive winding, FIG. 3. Three such assemblies, one for each phase would be required to produce a complete winding for the alternator.

The shape of the wave form conductor element 70 may be altered from that shown in FIG. 5, for example, by making the circular portions 73 and 74 of each element 70 below and above the groups of three pole piece 10 assemblies radially wider than shown to reduce the electrical resistance in those areas. The radial sections 75 of the elements 70 can be made as shown in FIG. 5, wider at the top and smaller at the bottom so as to completely fill the available area between the pole pieces 10. Aluminum stampings 70 can be used for the conduction material for producing windings with an electrical resistance equal to or less than that of a conventional coil made of copper wire even though aluminum is only 60% as good as conductor as copper but the cross section above and below the pole pieces 10 can be made twice as wide and the areas between the pole pieces 10 can have a high ratio of conductor to available area.

Figure 6:
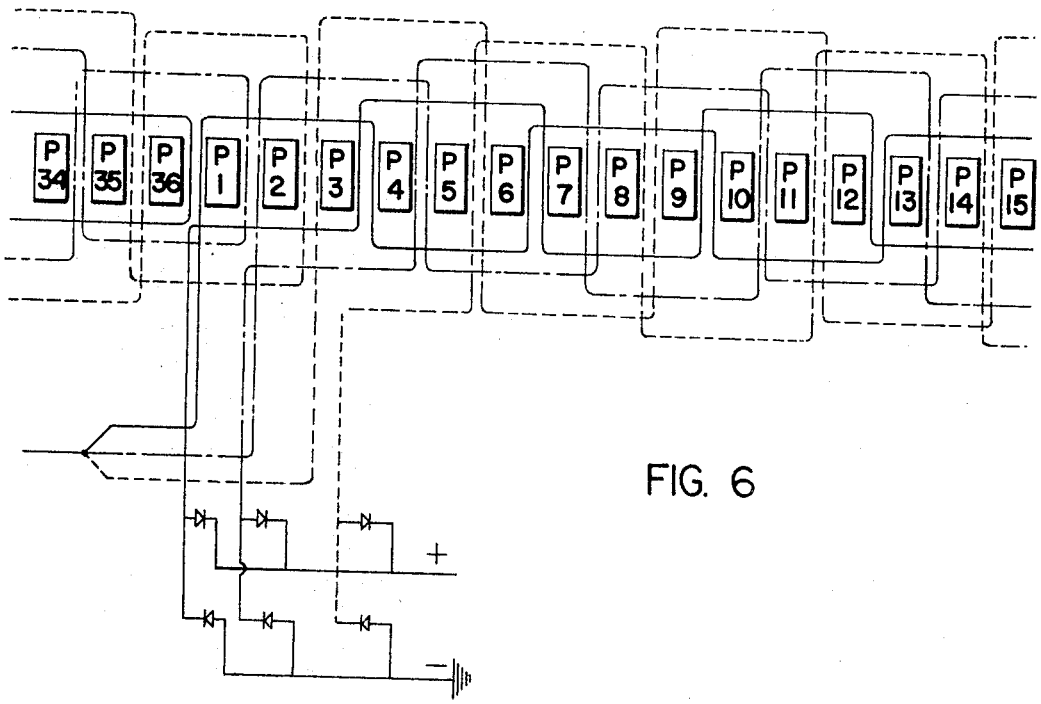
FIG. 6 is a schematic diagram of a wave form winding employing the conductor elements of FIG. 5.

Using both side projections 21 one half inch long on each side, a three phase wave form winding as in FIG. 6 can be installed by placing one and one half phase on each side of the center mounting ring 8. There will be, for example, thirty-six insulating pieces of a similar shape and cut with the same die used to cut the elements 70 to complete the assembly of an entire stator winding. Using .015″ thick material for the elements 70 and .005″ thick insulating material, the total thickness for the three phase winding would be .72″ The clearance between the outside elements 70 assembled on the pole piece projections 21 and the ends of the projections 21 would be slightly greater than ⅛″ on each side.

Figure 7:
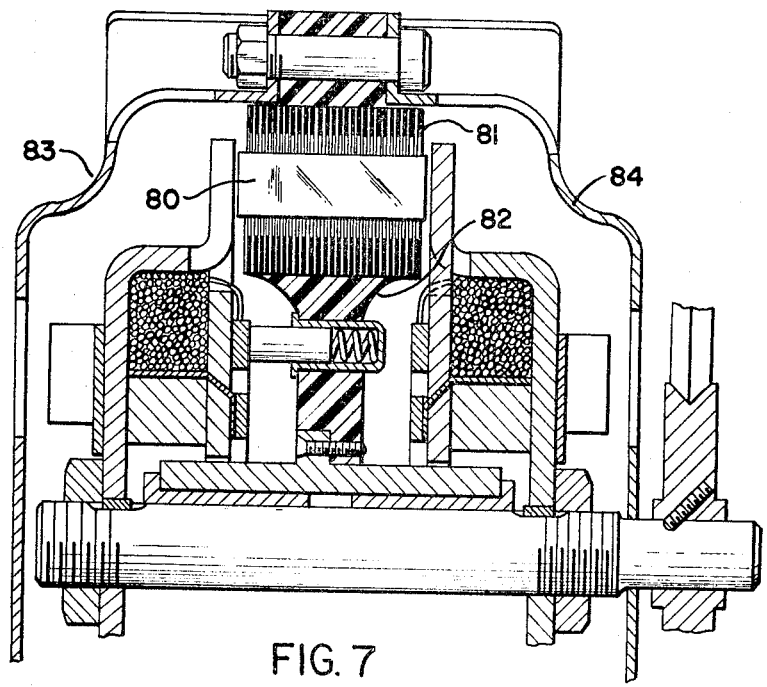
FIGS. 7 and 8 are cross-section views like FIG. 2 illustrating modified stator structures.

In FIG. 7 a plurality of circumferentially spaced, flat, rectangular, straight laminated pole pieces 80 are used. Three phases of wave form windings 81 are shown distributed from one end of the pole pieces 80 to the other with the entire assembly molded in plastic 82, thus making a unitary structure also comprised of flux isolated and electrically insulated pole pieces 80, such unitary structure being adapted to be clamped between housing parts 83 and 84.

Figure 8:
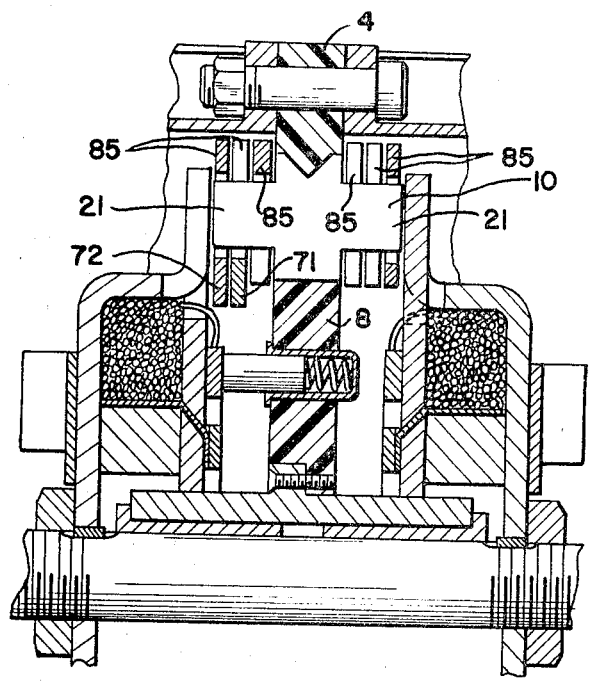

In FIG. 8, six heavy wave form conductor elements 85 are placed on the projections 21 of the pole pieces 10. Each phase shown in FIG. 8 consists of but two conducting elements 85 per phase. The FIG. 8 section is through P2 with the first phase winding starting at tab 71 and ending at tab 72. The second phase has one element 85 on the left and one on the right side of the center section 8 and the third phase consists of the last two elements 85 on the right. For uniformity of illustration the starting and finishing ends of elements 70, 81, and 85 are shown on the inside of the circle of the stator pole pieces. In actual manufacture when using the heavy section wave form conductor elements 85, both the start and finish of each phase winding will be on the outside of the ring of pole pieces 10 and in fact will be extended through the assembly bolt circle in such a manner that the starting ends can be electrically joined and the finishing ends of the three phases can be connected to a step-up transformer before being connected to the full wave rectifier system employed. These thick elements 85 can be made by casting or forming out of powdered metals.

Figure 10:
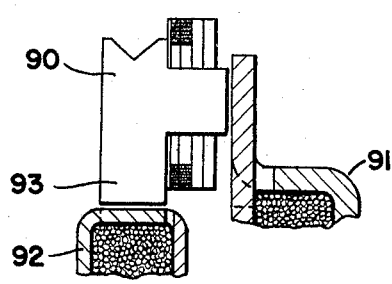
FIG. 10 is a cross-section view like FIGS. 2, 7, and 8 illustrating yet another form of stator structure.
Figure 9:
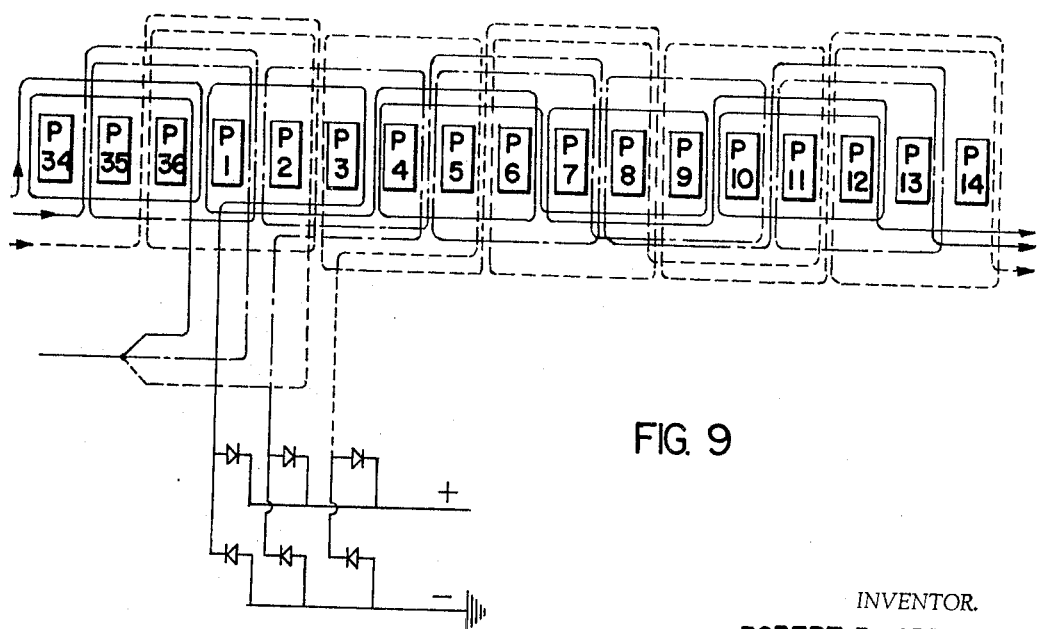
FIG. 9 is a schematic diagram of another progressive winding.

FIG. 9 is a schematic diagram of a regular progressive winding. On this winding all inter phase coil connections are made on the inside of the circle of pole pieces. The turns on this winding, phase one, starting at the rectifier encompass poles 1, 2, 3 in counterclockwise rotation, poles 4, 5, 6 in colckwise rotation, 7, 8, 9 in counterclockwise rotation, etc. through the winding. On the alternate progressive winding of FIG. 3 all coils are wound in the same direction, and all are interchangeable with each other. They encompass only alternate groups of pole pieces, to be able to accomplish this feature of interchangeability. It appears that the alternate progressive type of winding of FIG. 3 is most desirable when using conventional wire wound preformed coils for the phase coils, while the wave form of winding of FIG. 6 will be best for phase sets of windings made up of stamped sets of conductor elements. There is sufficient stacking space on the one-half inch pole piece projections 21 to accommodate the three phase sets of wave form windings when the wave form elements are made up of a number of assembled components for each single wave form element. This type of design shown in FIG. 10 has flux travel axially and radially through the pole pieces 90, the first exciter set 91 being like those shown in FIGS. 2, 7, and 8, and the second exciter set 92 being inside the radial arms 93 of the pole pieces 90.

The exicitation of the electromagnetic coils 47 may be varied automatically in known manner by the use of a conventional voltage regulator governed by the output voltage from the stator windings.

It can thus be seen that the present invention provides a very efficient alternator from the electrical standpoint and, furthermore, the mechanical construction is such that manufacturing costs are minimum.

The stator structures of FIGS. 1, 2, 7, and 8 require a minimum of electrical insulation between the elements of each phase winding, between the phase windings, and between the phase windings and the stator pole pieces because the windings are either strip layer wound or layer stacked for low voltage drop between adjacent turns, i.e. ¼ volt maximum in the example herein given, and the stator pole piece assemblies are flux isolated and electrically insulated from each other as aforesaid. Accordingly, anodized aluminum strip layer coils as in FIG. 1 or anodized aluminum wave form windings as in FIG. 7 may be employed to provide the necessary electrical insulation coupled with superior heat dissipation, especially since the coils need not be distorted during assembly and thus the insulation will not be damaged or destroyed. If desired, insulating spacers may be provided between the phase windings for better ventilation.

Figure 11:
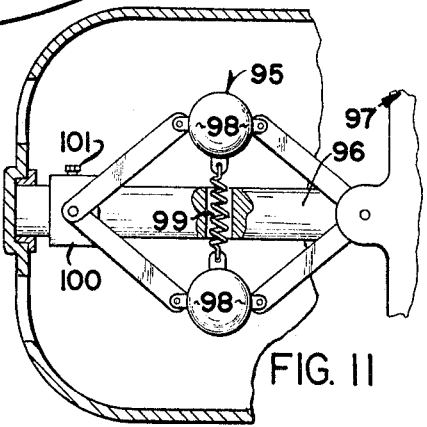
FIG. 11 is a fragmentary view, partly in elevation and partly in cross-section, illustrating a modification wherein the air gap between the rotor pole members and the stator pole pieces is automatically adjusted according to rotor speed.

It is to be noted that in the machines of FIGS. 2, 7, and 8, for example, the total air gap remains constant despite wear of the bearings 6. Moreover, the air gaps may readily be adjusted as by shims (not shown) inserted between the ends of bearings 6 and pole members 42. If, in the case of automotive use, for example, it is desired to vary automatically the air gap from a minimum value to provide a high alternator output at engine idling speed to progressively larger values at progressively increasing engine speeds, a governor 95 may be mounted on the extension 96 of the rotor shaft as shown in FIG. 11, the electromagnet 97 being axially slidably splined on the rotor shaft. The weights 98 and spring 99 of the governor are selected so that at engine idling speed the electromagnet 97 is held in its most forward position to establish the minimum air gap for maximum alternator output and so that as the engine speed increases, with resulting increase in the speed of rotor shaft 96, the weights will move radially outward thus to draw the electromagnet 97 rearward progressively to increase the air gap. The fixed collar 100 of the governor 95 may be axially adjusted on shaft 96 and locked by setscrew 101 to establish a desired pre-load holding the electromagnet at its minimum air gap position.

Figure 12:
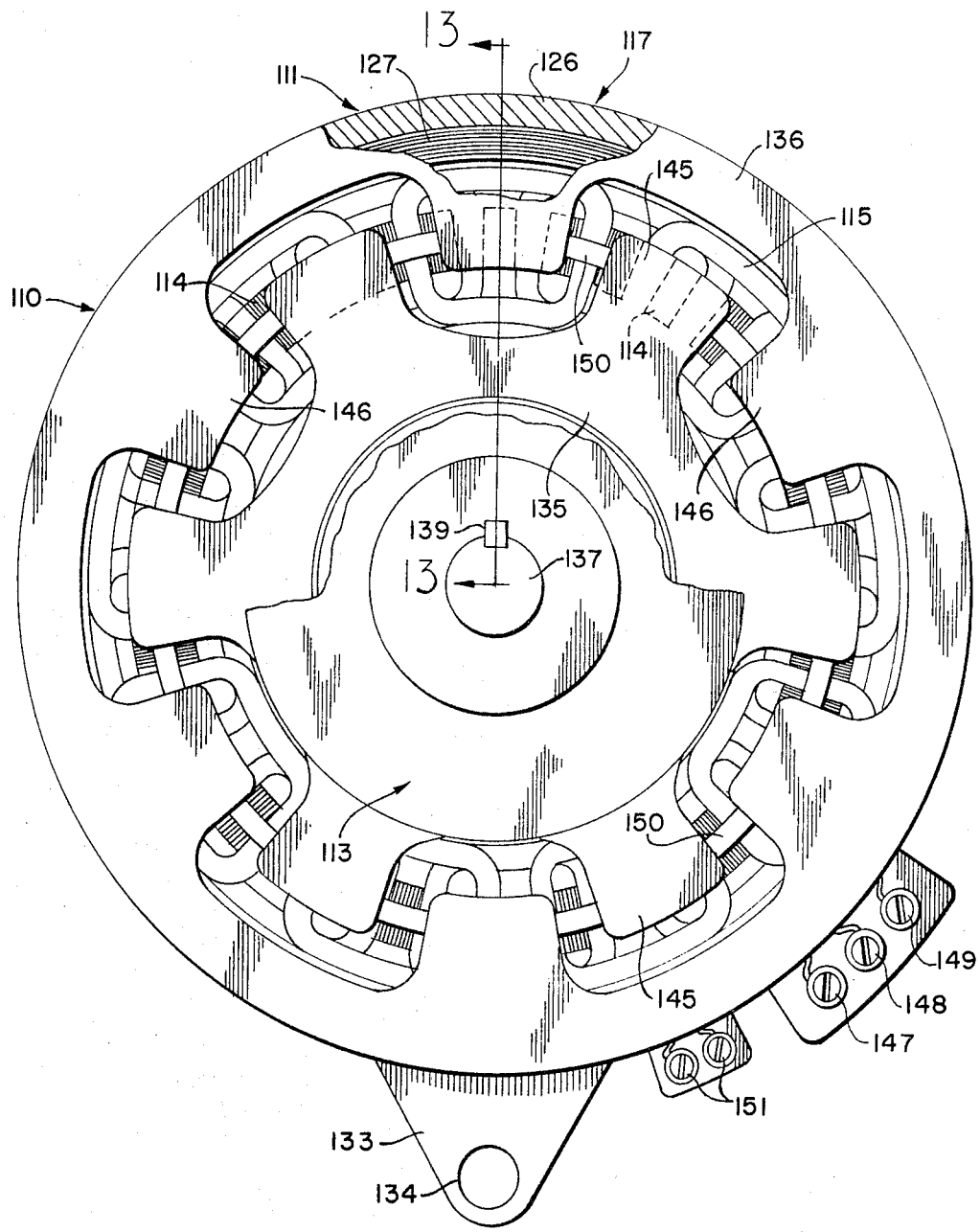
FIG. 12 is a front elevation view, partially broken away, of still another form of alternator according to the present invention.

Referring next to FIGS. 12 and 13, there is illustrated still another embodiment of a dynamoelectric machine in accordance with the present invention, it being generally indicated by the numeral 110 and comprising a stator assembly 111 in which there is journaled as by means of conventional thrust bearings 112 a rotor assembly 113. The stator assembly 111 comprises a plurality of circumferentially spaced laminated pole pieces 114 made from flat, rectangular strips or the like having three phases of wave form windings 115 distributed from one end to the other, as in the FIG. 7 embodiment, and a pair of concentric electromagnets 116 and 117 for exciting the annular pole segments of the rotor assembly 113, in a manner which will be fully explained hereafter. The inner electromagnet 116 is in the form of an iron core ring 118 with an outer peripheral groove 119 in which a D.C. exciting coil 120 is wound, such iron core ring 118 having a central, axially extending bore 121 and counterbores 122 at each end with nonmagnetic liners 123 for receipt of the outer races 124 of the bearings 112, and machined radially extending end surfaces 125.

The outer electromagnet 117 likewise includes an iron core ring 126 and a D.C. exciting coil 127 preferably supported by a bobbin 128 made of a suitable nonmagnetic material such as aluminum, for example. The flow of flux between the iron core ring 126 and rotor assembly 113 may be increased by increasing the amount of exposed area at the ends 130 of the iron core ring 126, as by attaching flat, annular iron discs 131 thereto with screws or the like. This entire stator assembly 111, including the annularly spaced pole pieces 114 with windings 115 disposed therearound and electromagnets 116 and 117, may be molded in a plastic 132 having the desired strength, stability, and insulating characteristics to form a unitary structure in which the stator pieces 114 are flux isolated and electrically insulated from each other, for reasons previously discussed. For rigidly mounting the stator assembly 111 on a support, there is a flange 133 projecting from the ring 126 with a bolt opening 134 extending therethrough (see FIG. 12).

The rotor assembly 113 comprises two pairs of relatively thin inner and outer concentric rings 135 and 136, respectively, disposed at opposite ends of the stator assembly 111. As best seen in FIG. 13, the inner rings 135 are supported on the rotor shaft 137 for rotation therewith by nonmagnetic hub portions 138 keyed or otherwise fixed to the shaft 137 at 139. The inner rings 135 are desirably attached to the respective hub portions 138 by screws 129. Suitable vane members, not shown, may be secured to the ends of the machine 110 to induce the circulation of cooling air over the external surfaces of the stator assembly 111. Of course, the rotor shaft 137 is mounted for rotation with respect to the stator assembly 111 by the thrust bearings 112, the inner races 140 of which are carried by spacers 141 press fitted on the rotor shaft.

The inner and outer rings 135 and 136, like the pole members 42 and 43 of FIGS. 1 and 2, are made of a magnetic material such as iron and are disposed in a common plane with their inner surfaces 142 and 143 axially closely adjacent the respective end surfaces 125 and 144 of the iron core rings 118 and 126. Projecting radially outwardly from the inner rings 135 are a plurality of circumferentially spaced rotor pole segments 145 between which there are received a plurality of similar rotor pole segments 146 extending radially inwardly from the outer rings 136 (see FIG. 12). These rotor pole segments 145 and 146 are axially adjacent the ends of the stator pole pieces 114 to provide axial flux paths therebetween in the order of from .010 inch to .040 inch, and are of a circumferential width to span substantially three pole pieces 114 for producing a three phase current in the stator windings 115 which lead to the terminals 147, 148, and 149. Moreover, there is desirably about a ⅜ inch clearance or more between the inner and outer rings 135 and 136 to cut down on the amount of flux leakage between the two rings, and such rings are connected together as by means of nonmagnetic inserts 150 of stainless steel, for example, welded or otherwise secured between adjacent pole segments 145 and 146 (see FIG. 12).

When the terminals 151 for the series wound coils 120 and 127 are connected to a D.C. excitation supply with such coils 120 and 127 wound in the same direction, the rotor pole segments for the respective rings 135 and 136 at opposite ends of the stator assembly 111 are of opposite polarity, whereby the adjacent pole segments 145 and 146 at each end of the stator assembly alternate between north and south poles. Accordingly, with the respective rotor pole segments 145 and 146 of the inner and outer rings 136 and 136 adjacent the ends of the stator assembly 111 positioned in axial alignment, driving of the rotor assembly 113 while the stator assembly 111 is held stationary will create full flux reversals in the stator pole pieces 114 as the pole segments 145 and 146 move sequentially therepast.

As shown schematically by the solid line arrows 152 in FIG. 13, the flux flow between one group of three stator pole pieces 114 and the outer pole segments 146 may be toward the left, in which case the flux flow between the adjacent group of three stator pole pieces 114 and the inner pole segments 145 is in the opposite direction or toward the right, represented by the dotted line arrows 153. Moreover, the disposition of the iron core rings 118 and 126 for the electromagnets 116 and 117 closely adjacent their respective pole segments 145 and 146 establishes more closely coupled flux circuits which results in increased flux flow. This advantageous result is, of course, made possible by the fact that the electromagnets 116 and 117 are a part of the stator assembly 111. Also, because the exciting coils 120 and 127 do not rotate, no brushes are needed for supplying current to such coils.

The increased flux flow made available by locating the iron core rings 118 and 126 directly closely adjacent their respective rotor pole segments 145, 146 is offset somewhat, however, by the nominal air gap that is required between the inner and outer rings 135, 136 and the associated iron core rings 118, 126 to permit relative rotation therebetween.

Instead of providing two sets of such inner and outer rings 135 and 136 adjacent each end of the stator 111, one such set could be eliminated and a single cup-shaped member 160 substituted therefor, as illustrated in the FIG. 14 embodiment. Otherwise, the details of the FIG. 14 assembly 110′ are substantially identical to that of the FIG. 13 embodiment and, therefore, the same reference numerals followed by a prime symbol (′) are used to designate like parts. The cup-shaped member 160 forms a part of the stator assembly 111′, with the annular wall 161 thereof preferably acting as the core for the outer D.C. exciting coil 127′. For accurately locating the cup-shaped member 160 on the stator assembly 111′, the base portion may be provided with a central opening 163 which is slidably received on the shoulder 164 of the inner core ring 118′, and a plurality of screws 165 may be used for attaching the base portion 162 of the cup-shaped member 160 directly to the iron core ring 118′.

In the form shown, there is an air gap 166 between the base portion 162 of the cup-shaped member 160 and the adjacent ends of the stator pole pieces 114′ so as to maintain the stator pole pieces flux isolated and electrically insulated from each other. However, such base portion 162 may touch the stator pole pieces 114′ to increase the amount of flux flow therebetween, but then of course the advantages of flux isolation and electric insulation of the stator pole piece assemblies would not be achieved. Since the cup-shaped member 160 is fixed with respect to the stator assembly 111′, however, there is no need for an air gap between the base portion 162 and the adjacent end surface 125′ of the iron core ring 118′.

In operation, the dynamoelectric machine of the FIG. 14 embodiment operates substantially the same as the FIG. 13 embodiment, except for the fact that the cup-shaped member 160 remains stationary during rotation of the rotor assembly consisting of the inner and outer rings 135′, 136′, and that such cup-shaped member 160 provides a common flux path for full flux reversals between the stator pole pieces 114′ and all of the rotor pole segments 145′, 146′. Thus, as the rotor assembly 113′ is caused to rotate past the stationary pole pieces 114′, the flux flow between such pole pieces 114′ and rotor assembly 113′ will alternately reverse from say a generally right direction through the pole pieces 114′ and inner pole segments 145′ and the opposite or left direction between such pole pieces and the alternate rotor pole segments 146′.

From the foregoing, it can now be seen that the various forms of dynamoelectric machines of the present invention are of extremely simple construction which permits them to be manufactured quite economically and yet such machines are very efficient in operation. One major design feature which has been quite important in lowering manufacturing costs is the use of a stator assembly in which the stator pole pieces are flux isolated and electrically insulated from each other, since it permits the use of stator windings with a minimum amount of insulation. Moreover, the stator pole pieces have axially extending projections sufficiently spaced apart to permit ready receipt of the stator windings without distortion, which often causes damage to the insulation on the stator windings, especially if the windings are anodized aluminum stampings.

The various disclosed types of rotor assemblies are also of a unique construction on which permits them to be manufactured at relatively low costs and still provides the desired flux flow paths for inducing a change of flux in the stator pole pieces.

Other modes of applying the principles of the invention may be employed, change being made as regards the details described, provided the features stated in any of the following claims or the equivalent of such be employed.

I therefore, particularly point out and distinctly claim as my invention:

1. A brushless dynamoelectric machine comprising a stator assembly having an annular series of stator pole pieces with windings therearound, a rotor assembly journaled in said stator assembly, said rotor assembly comprising a pair of inner and outer concentric rings lying in a common plane, said inner ring having a plurality of circumferentially spaced, radially outwardly extending excitation pole segments, said outer ring having a plurality of circumferentially spaced radially inwardly extending excitation pole segments disposed between said outwardly extending pole segments with spaces between said inwardly and outwardly extending pole segments, said pole segments providing alternate north and south excitation poles arranged annularly in a plane which is axially opposite and closely spaced adjacent one end of said stator pole pieces to form air gaps therebetween, magnetic means in said stator assembly for exciting said alternate north and south excitation poles, and means for completing the flux path for full flux reversals between said north and south excitation poles and said stator pole pieces.

2. The machine of claim 1 wherein said magnetic means in said stator assembly includes an inner electromagnet comprising an inner annular core disposed within said annular series of stator pole pieces, and an exciting coil wound around said inner annular core, said inner annular core having a radially extending end surface directly adjacent and parallel to an end surface of said inner ring with an air gap therebetween; and an outer electromagnet comprising an outer annular core surrounding said annular series of stator pole pieces, and a second exciting coil for said outer annular core, said outer annular core also having a radially extending end surface directly adjacent and parallel to an end surface of said outer ring with an air gap therebetween; said electromagnets being adapted to create pole segments of opposite polarity in said inner and outer rings.

3. The machine of claim 2 wherein said inner and outer rings are held together by a plurality of nonmagnetic inserts secured between adjacent segments.

4. The machine of claim 2 wherein said inner annular core has an outer peripheral groove in which its associated exciting coil is wound, and there is a bobbin for supporting the other exciting coil closely adjacent the inner surface of said outer annular core.

5. The machine of claim 1 wherein the turns of each phase of said stator windings encompass each successive group of three stator pole pieces, said windings being wound about the first group in a clockwise direction, continued to be wound about the second group in a counter-clockwise direction, continued to be wound about the third group in a clockwise direction, and so on in such alternate manner, each of said excitation pole segments encompassing three stator pole pieces.

6. The machine of claim 1 wherein said stator pole pieces are provided with axially extending arm portions about which pre-wound coils comprised of said windings are adapted to be placed with a straight movement parallel to the line of flux path without physical distortion of said coils, said stator pole pieces and windings being embedded in plastic to make a unitary structure and to provide separate stator pole pieces which are flux isolated and electrically insulated from each other, thereby assuring maximum use of flux reversals in the pole pieces and reducing to a minimum the amount of electrical insulation required for the associated windings.

7. The machine of claim 6 wherein said preformed coils are strip layer wound for low voltage drop between adjacent turns, said strips being made of anodized aluminum to provide electrical insulation therebetween and good heat dissipation therefrom.

8. The machine of claim 2 wherein said means for completing the flux path for full flux reversals between said north and south excitation poles and said stator pole pieces includes a cup-shaped member in which said annular series of stator pole pieces is disposed with the other ends of said stator pole pieces located adjacent the base portion of said cup-shaped member, said cup-shaped member being of a magnetic material and providing a common flux path for full flux reversals of the flow of flux through said stator pole pieces and the alternate north and south excitation pole segments of said inner and outer rings during rotation of said rotor assembly.

9. The machine of claim 8 wherein the annular wall of said cup-shaped member forms said outer annular core.

10. The machine of claim 1 wherein said means for completing the flux path for full flux reversals between said north and south excitation poles and said stator pole pieces comprises a second pair of inner and outer concentrically disposed rings lying in a common plane axially adjacent the other end of said stator pole pieces, and the excitation pole segments of the inner and outer rings, respectively, at opposite ends of said stator pole pieces are of opposite polarity and in axial alignment, whereby the north and south pole segments of said inner rings are in axial alignment with each other, and the south and north pole segments of said outer rings are in axial alignment with each other.

11. A brushless dynamoelectric machine comprising a stator assembly having an annular series of stator pole pieces with windings therearound, a rotor assembly journaled in said stator assembly, said rotor assembly comprising a pair of inner and outer concentric rings lying in a common plane, said inner ring having a plurality of circumferentially spaced, radially outwardly extending excitation pole segments, said outer ring having a plurality of circumferentially spaced, radially inwardly extending excitation pole segments disposed between said inwardly extending pole segments with spaces between said inwardly and outwardly extending pole segments, said pole segments providing alternate north and south excitation poles arranged annularly in a plane which is axially opposite and closely spaced adjacent one end of said stator pole pieces to form air gaps therebetween, nonmagnetic inserts secured between adjacent segments for holding said inner and outer rings together, an inner electromagnet in said stator assembly comprising an inner annular core disposed within said annular series of stator pole pieces, and an exciting coil wound around said inner annular core, said inner annular core having a radially extending end surface directly adjacent and parallel to an end surface of said inner ring with an air gap therebetween, an outer electromagnet in said stator assembly comprising an outer annular core surrounding said annular series of stator pole pieces, and a second exciting coil for said outer annular core, said outer annular core also having a radially extending end surface directly adjacent and parallel to an end surface of said outer ring with an air gap therebetween, said electromagnets being adapted to create pole segments of opposite polarity in said inner and outer rings; the turns of each phase of said stator windings encompassing each successive group of three stator pole pieces, said windings being wound about the first group in a clockwise direction, continued to be wound about the second group in a counter-clockwise direction, continued to be wound about the third group in a clockwise direction, and so on in such alternate manner, each of said excitation pole segments encompassing three stator pole pieces; said stator pole pieces being provided with axially extending arm portions about which pre-wound coils comprised of said windings are adapted to be placed with a straight movement parallel to the line of flux path without physical distortion of said coils, said stator pole pieces and windings being embedded in plastic to make a unitary structure and to provide separate stator pole pieces which are flux isolated and electrically insulated from each other, thereby assuring maximum use of flux reversals in the pole pieces and reducing to a minimum the amount of electrical insulation required for the associated windings.

References Cited by the Examiner
UNITED STATES PATENTS

| | | | |
|---|---|---|---|
| 296,857 | 4/1884 | Lubhe | 310—268 |
| 2,412,461 | 12/1946 | Macintyre | 310—162 |
| 2,432,573 | 12/1947 | Jorgensen | 310—164 |
| 2,479,589 | 8/1949 | Parker | 310—268 |
| 2,541,830 | 2/1951 | Phaneuf | 310—163 XR |
| 2,743,375 | 4/1956 | Parker | 310—268 XR |
| 3,159,764 | 12/1964 | Henry-Baudot | 310—268 |
| 3,181,020 | 4/1965 | Welter | 310—164 |

MILTON O. HIRSHFIELD, *Primary Examiner.*

J. J. SWARTZ, *Assistant Examiner.*